(12) United States Patent
Kohinata et al.

(10) Patent No.: US 8,268,224 B2
(45) Date of Patent: Sep. 18, 2012

(54) METHOD FOR PRODUCING POLYETHERSULFONE FIBER

(75) Inventors: Yusaku Kohinata, Tsukuba (JP); Satoshi Okamoto, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 1025 days.

(21) Appl. No.: 12/153,161

(22) Filed: May 14, 2008

(65) Prior Publication Data
US 2009/0047515 A1 Feb. 19, 2009

(30) Foreign Application Priority Data

May 17, 2007 (JP) ................. 2007-132056

(51) Int. Cl.
*D06M 10/00* (2006.01)
*H05B 7/00* (2006.01)
(52) U.S. Cl. ...................................... 264/465
(58) Field of Classification Search .................... 264/465
See application file for complete search history.

(56) References Cited

U.S. PATENT DOCUMENTS

| 2002/0089094 A1* | 7/2002 | Kleinmeyer et al. | 264/465 |
| 2003/0004302 A1* | 1/2003 | Okamoto et al. | 528/373 |
| 2003/0213218 A1 | 11/2003 | Dubson | |
| 2003/0224222 A1* | 12/2003 | Matsuoka et al. | 428/704 |
| 2004/0207126 A1* | 10/2004 | Czado | 264/465 |
| 2007/0102372 A1* | 5/2007 | Ferrer et al. | 210/767 |

FOREIGN PATENT DOCUMENTS

| JP | 5-255505 | 10/1993 |
| JP | 2002-166144 | 6/2002 |
| JP | 2003/501237 A | 1/2003 |
| JP | 2003-321556 | 11/2003 |
| JP | 2004-300242 | 10/2004 |
| JP | 2006-341233 | 12/2006 |
| WO | WO 2007/001405 | 1/2007 |

OTHER PUBLICATIONS

Third-party Observation in JP 2008-131070 dated Sep. 8, 2011.

* cited by examiner

*Primary Examiner* — Leo B Tentoni
(74) *Attorney, Agent, or Firm* — Foley & Lardner LLP

(57) ABSTRACT

The present invention provides a method for producing a polyethersulfone fiber, the method comprising the steps of discharging an electrically charged solution comprising a polyethersulfone and a solvent from a container; and drawing the charged solution by electrical attraction in an electrical field generated between the solution and an electrically charged collecting means having the opposite charge of the solution, while evaporating at least a portion of the solvent to form a polyethersulfone fiber. The fiber obtained in the present invention has a small average fiber diameter and can be made into a thin fiber cloth.

5 Claims, 2 Drawing Sheets

METHOD FOR PRODUCING POLYETHERSULFONE FIBER

BACKGROUND OF THE INVENTION

1. Field of the Invention

The present invention relates to a polyethersulfone fiber, a production method thereof, and a filter.

2. Description of the Related Art

In a semiconductor production, a filter having strong resistance to chemical liquids (containing organic solvents, acids, alkalis, oxidizers and the like) and being difficult to arise elution substance from a filter has been demanded. As the filter with such characteristics, microporous microfiltration membranes made of a polytetrafluoroethylene (PTFE) have conventionally been used widely. However, since the PTFE is expensive, the production cost tends to be increased, particularly when such the membrane such as the microfiltration membrane is prepared from the PTFE and utilized in the semiconductor production and the like. In recent years, investigations are made on the use of a more inexpensive polyethersulfone for the filter, instead of using the PTFE (see JP-A-2002-166144).

The polyethersulfone, however, tends to be difficult to be made into a fiber having a small fiber diameter. Such a filter of polyethersulfone fiber having not so small fiber diameter may be difficult to sufficiently trap fine particles, and therefore, is sometimes not appropriate for the microfiltration membrane used in the semiconductor production.

SUMMARY OF THE INVENTION

The present invention has been accomplished under the above-described circumstances. One of objectives of the present invention is to provide a polyethersulfone fiber having a small fiber diameter, a method for producing such a polyethersulfone fiber and a filter comprising the polyethersulfone fiber.

In the present invention, a polyethersulfone fiber can be produced by a method of allowing a solution comprising a polyethersulfone and a solvent to be discharged by an electrical force in an electrical field.

Specifically, the present invention provides a method for producing a polyethersulfone fiber, the method comprising the steps of:

discharging an electrically charged solution comprising a polyethersulfone and a solvent from a container; and drawing the charged solution by electrical attraction in an electrical field generated between the solution and an electrically charged collecting means having the opposite charge of the solution, while evaporating at least a portion of the solvent to form a polyethersulfone fiber.

In the present invention, a polyethersulfone fiber is produced by an electrostatic spinning, wherein a polymer solution comprising a polyethersulfone is discharged in an electric field to be scatted by electrical attraction. The inventors of the present invention have found that a thinner polyethersulfone fiber can be formed by the production method of the present invention, as compared to the polyethersulfone fibers obtained by the conventional methods. The polyethersulfone fiber obtained in the present invention can be thin and fine, since the electrostatic spinning in the present invention allows the polyethersulfone solution to be drawn out by electrical attraction so as to form a thin, fine fiber. The polyethersulfone fiber obtained by the production method of the present invention provides a filter which can collect foreign particles including fine particles in the production process of semiconductor and the like.

DETAILED DESCRIPTION OF THE PREFERRED EMBODIMENTS

Figure 1:
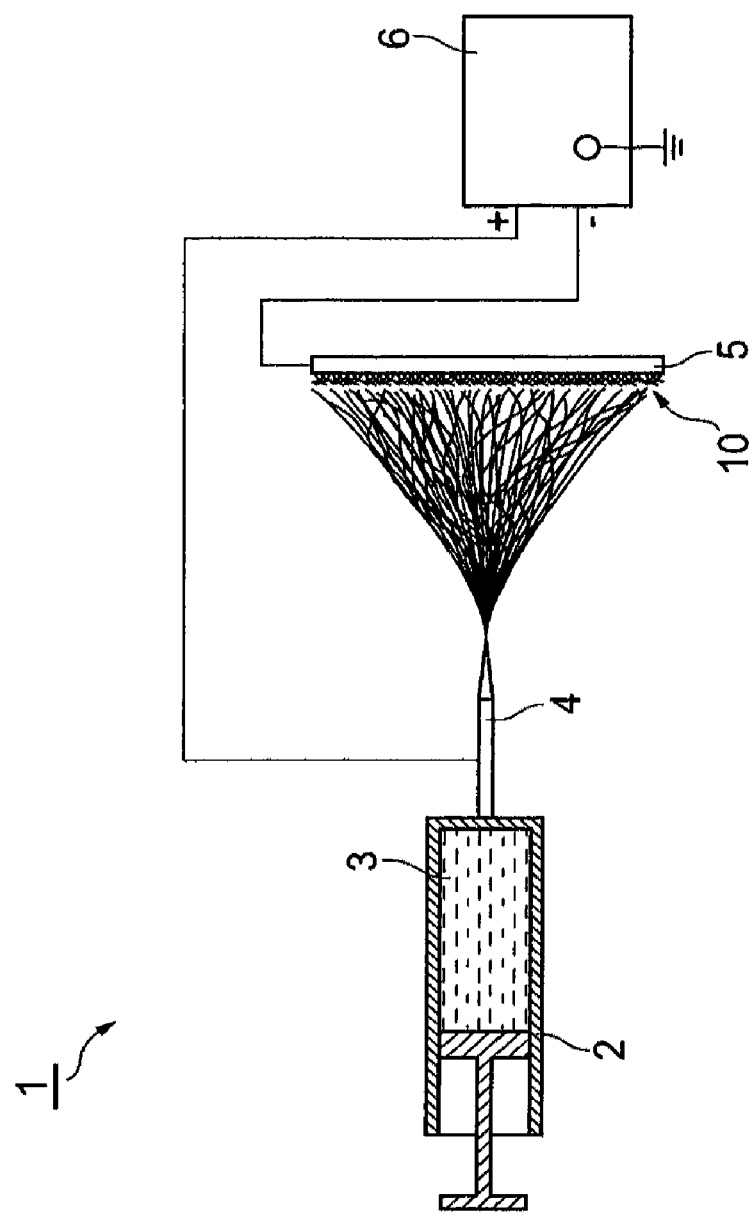
FIG. 1 is a view showing an example electrostatic spinning apparatus which can be utilized in the present invention.

In the present invention, a polyethersulfone fiber can be produced by a method comprising the steps of:

discharging an electrically charged solution comprising a polyethersulfone and a solvent from a container; and drawing the charged solution by electrical attraction in an electrical field generated between the solution and an electrically charged collecting means having the opposite charge of the solution, while evaporating at least a portion of the solvent to form a polyethersulfone fiber.

The polyethersulfone used in the present invention is preferably soluble in an organic solvent. Such a polyethersulfone is advantageous in preparing a thin polyethersulfone fiber, since the polyethersulfone is capable of easily producing a polymer solution comprising the polyethersulfone which can be easily applied in the electrostatic spinning mentioned above.

The polyethersulfone used in the present invention preferably has a structural unit represented by the formula (1) below:

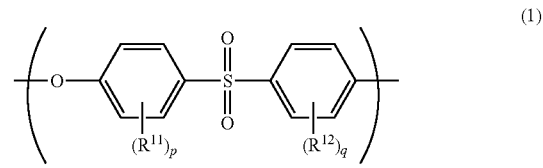

wherein each of $R^{11}$ and $R^{12}$ independently represents a halogen atom, a phenyl group, an alkyl group having 1 to 6 carbon atoms, or an alkenyl group having 2 to 10 carbon atoms; and each of p and q is independently an integer of 0 to 4. When p and/or q is 2 to 4, each of $R^{11}$s and $R^{12}$s may be the same or different.

The polyethersulfone having the above structure tends to be easily dissolved into a solvent, and in particular, a polymer solution thereof tends to be easily prepared. Therefore, such a polyethersulfone and the polymer solution thereof are suitably used for electrostatic spinning in the present invention, to produce a polyethersulfone fiber having a small fiber diameter.

Also, in the electrostatic spinning in the present invention, it is preferred to use such a polyethersulfone that when about 0.5 g/dl of a polymer solution of the polyethersulfone with a N,N-dimethylacetamide solvent is prepared, the polymer solution has a reduced viscosity of from 0.4 to 0.7 g/dL, more preferably a reduced viscosity of from 0.4 to 0.65 g/dL, at a temperature of about 25° C. Such a polyethersulfon is preferably used in the electrostatic spinning in the present invention, since the resulting polymer solution of the polyethersulfon can easily provide a polyethersulfone fiber having a small fiber diameter.

Another preferable polyethersulfone used in the present invention preferably further has, in addition to the structural unit of the formula (1) mentioned above, a structural unit represented by the formula (2) below:

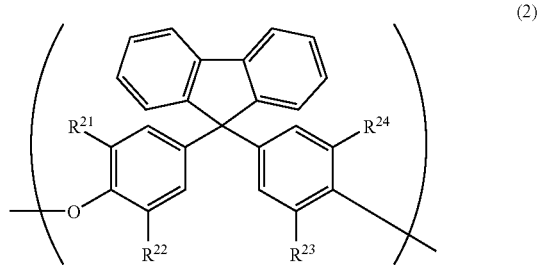

(2)

wherein each of $R^{21}$, $R^{22}$, $R^{23}$ and $R^{24}$ independently represents a hydrogen atom or an alkyl group having 1 to 6 carbon atoms.

While the polyethersulfone having such a structure has a high glass transition temperature (Tg), the polyethersulfone can be dissolved into a solvent and easily made into a fiber by the production method of the present invention. As a result, when such a polyethersulfone is used in the present invention, a polyethersulfone fiber having a high Tg, an excellent heat resistance and a small fiber diameter can be obtained.

In the present invention, it is possible to obtain a fiber of the polyethersulfone having the formula (1) mentioned above, the fiber having a Tg of 260° C. or higher and an average fiber diameter of from 0.01 to 0.5 μm. Such a polyethersulfone fiber is microporous, and therefore, is suitable for providing a filter for microfiltration as well as a filter having high heat resistance. Such a polyethersulfone fiber having a small fiber diameter and a high Tg has been hardly obtained by the conventional fiber-production methods.

The present invention can provides a filter having a high Tg, excellent in heat resistance, which comprises a fiber of the polyethersulfone having a small fiber diameter. The filter can be used in a microfiltration in a semiconductor production process and the like to have excellent filtration properties in, for example, collection of dust, fine particles and the like.

Thus, in according to the present invention, a polyethersulfone fiber having a small fiber diameter is provided, as mentioned above. Also, a polyethersulfone fiber having a smaller diameter and a higher glass transition temperature (Tg) (as compared to those of the conventionally obtained polyethersulfone fibers) can be obtained.

Preferable embodiments of the present invention will be described below in more detail, which should not be construed as a limitation upon the scope of the present invention.

A preferable polyethersulfone fiber can be obtained in the present invention from a polyethersulfone having a structural unit represented by the formula (1) mentioned above. The polyethersulfone fiber may have an average fiber diameter of 0.01 to 5 μm and a grass transition temperature (Tg) of 260° C. or higher. The polyethersulfone fiber may be formed from one kind of polyethersulfones, or from two or more kinds of polyethersulfones. When in the formula (1) p and/or q is an integer of 2 to 4, each of $R^{11}$s and $R^{12}$s may be the same or different.

When the polyethersulfone fiber has an average fiber diameter of smaller than 0.01 μm, the production process of the fiber may have difficulty. On the other hand, when the polyethersulfone fiber has an average fiber diameter of larger than 5 μm, the surface area of the fiber may be small, and the fiber cloth made from the fiber may have a larger thickness, which is inappropriate for a microfilter. From the viewpoint of easy production and achieving a larger surface area and a small thickness of the resulting cloth, the average fiber diameter of the polyethersulfone fiber is more preferably in the range of from 0.05 to 0.4 μm.

When the polyethersulfone with Tg of lower than 260° C. is used, the resulting filter or the like may have insufficient heat resistance. From the viewpoint of achieving good heat resistance, it is more preferable to use a polyethersulfone with Tg of 270° C. or higher. Please note that the Tg of the polyethersulfone fiber is a temperature at which the polymer constituting the polyethersulfone fiber turns into a rubber state from a non-crystalline glass state, and can be measured by heat flux differential scanning calorimetric measurement of JIS K 7121 (1987).

As mentioned above, the polyethersulfone used in the present invention preferably has, in addition to the structural unit of the formula (1), a structural unit represented by the formula (2). Such a polyethersulfone tends to easily provide a fiber with a glass transition temperature (Tg) of 260° C. or higher and to be sufficiently dissolved in solvents.

The above-mentioned polyethersulfone having both of the structural units represented by the formula (1) and the structural unit represented by the formula (2) may be a random copolymer, an alternate copolymer or a block copolymer having the structural units. When in the polyethersulfone the number of structural units represented by the formula (1) is k, and the number of structural unit represented by the formula (2) is l, then a ratio k:l is preferably in the range of from 0.1:100 to 100:0.1. A value l/l+k is preferably in the range of from 0.3 to 0.5, more preferably in the range of from 0.4 to 0.5. When the value l/l+k is less than 0.3, the polyethersulfone fiber obtained from the polyethersulfone tends to have a low Tg. When the value l/l+k exceeds 0.5, a polymer solution prepared using the polyethersulfone tends to deteriorate in storage stability, and also the production cost of the polyethersulfone may be high since a raw material for the structural unit represented by the formula (2) may be expensive.

Another preferable polyethersulfone used in the present invention may be a random copolymer, an alternate copolymer, or a block copolymer which further has a structural unit other than the structural units of the formulas (1) and (2), in addition to the structural units of the formulas (1) and (2).

One of examples of such a structural unit other than the structural units of the formulas (1) and (2) is a structural unit represented by the formula (3) below:

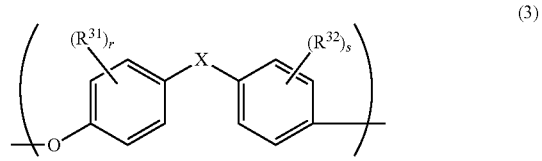

(3)

wherein each of $R^{31}$ and $R^{32}$ independently represents a halogen atom, a phenyl group, an alkyl group having 1 to 6 carbon atoms, or an alkenyl group having 2 to 10 carbon atoms; each of r and s is independently an integer of 0 to 4; and X represents a single bonding, a group represented by —S—, a group represented by —O—, a carbonyl group, a divalent aliphatic hydrocarbon group having 1 to 20 carbon atoms, or a divalent alicyclic hydrocarbon group having 5 to 20 carbon atoms. When r and/or s is an integer of 2 to 4, each of $R^{31}$s and $R^{32}$s may be the same or different.

Another example of the structural unit other than the structural units of the formulas (1) and (2), which may be in the preferable polyethersulfone used in the present invention, is a structural unit represented by the formula (4) below:

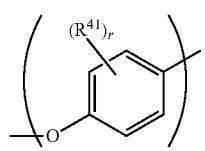

(4)

wherein r is an integer of 0 to 4, and is preferably 0, 1 or 2; and $R^{41}$ represents a halogen atom, a phenyl group, an alkyl group having 1 to 6 carbon atoms or an alkenyl group having 2 to 10 carbon atoms. When r is an integer of 2 to 4, each $R^{41}$ may be the same or different.

Another example of the structural unit other than the structural units of the formulas (1) and (2), which may be in the preferable polyethersulfone used in the present invention, is a structural unit represented by the formula (5) below:

(5)

wherein $Ar^{51}$ represents a divalent condensed polycyclic hydrocarbon group, and an aromatic ring in the divalent condensed polycyclic hydrocarbon group may be substituted by an alkyl group having 1 to 6 carbon atoms, provided that $Ar^{51}$ is selected so that the structural unit represented by the formula (5) is not identical to the structural unit represented by the formula (1) in the polyethersulfone.

Examples of the halogen atom in the structural units represented by the formulas (1) to (5) include a fluorine atom, a chlorine atom, a bromine atom, an iodine atom and the like. Also, examples of the alkyl group having 1 to 6 carbon atoms in the structural units represented by the formulas (1) to (5) include a methyl group, an ethyl group, a propyl group, a butyl group, a pentyl group, a hexyl group and the like. The alkyl group may be a straight chain group, a branched chain group or a ring group. Also, examples of the alkenyl group having 2 to 10 carbon atoms in the structural units represented by the formulas (1), (3) and (4) include a vinyl group, propenyl group, butenyl group, and the like. The alkenyl group may be a straight chain group, a branched chain group or a ring group.

If a polyethersulfone has any of the structural units represented by the formulas (1) to (5), of which aromatic rings in the structural units have one or more substituent(s) such as a halogen atom, a phenyl group, an alkyl group and an alkenyl group, then the polyethersulfone tends to increase solubility in a solvent, while the polyethersulfone also tends to lower Tg. Therefore, the number(s) and/or type(s) of the substituent(s) of monomers for preparing a polyethersulfone is/are appropriately selected with considering the balance in effects between the increased solubility and the lowered Tg due to the substituent(s).

Examples of the divalent condensed polycyclic hydrocarbon group in the formula (5) include divalent groups, each of which is obtained by removing two hydrogen atoms from condensed polycyclic hydrocarbon such as pentalene, indene, naphthalene, azulene, heptalene, as-indacene, s-indacene, acenaphthylene, fluoranthene, acephenanthrylene, aceanthrylene, triphenylene, pyrene, chrysene, naphthacene, picene and pentaphene.

As mentioned above, the polyethersulfone suitably used in the present invention has the structural units represented by the formulas (1) and (2) and may have the structural unit represented by the formula (3), (4) and/or (5) within a range that does not impair characteristics of the resulting polyethersulfone fiber and workability in production thereof. When the polyethersulfone has the structural unit other than the structural units of the formulas (1) and (2), it is more preferable to have a combination of two or more of the structural units represented by the formulas (3), (4) and (5), and it is further preferable to have the combination of all of the structural units represented by the formulas (3), (4) and (5).

When a polyethersulfone has the structural units represented by the formulas (1) and (2) as well as the other units, and the numbers of the structural units represented by the formula (1), (2) and the other units are is k, l and m, respectively, then each of a ratio k:l, a ratio l:m and a ratio k:n is preferably in the range of from 0.1:100 to 100:0.1. A value l/(k+l+m) is preferably in the range of from 0.3 to 0.5, and is more preferably in the range of from 0.4 to 0.5. When the polyethersulfone contains a plurality of types of the structural units other than the structural units of the formulas (1) and (2), the total number of a plurality of types of the structural units corresponds to m.

Specifically, the polyethersulfone for the polyethersulfone fiber in the present invention preferably has structural units represented by the formulas (6a) and (6b), each of which is shown below:

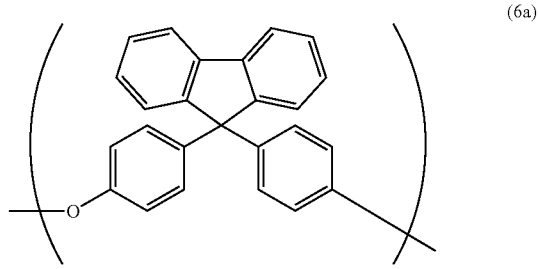

(6a)

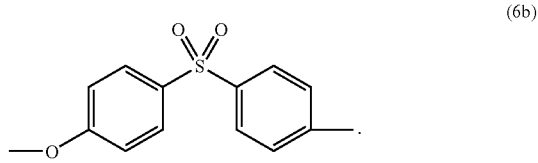

(6b)

Such a polyethersulfone is preferably used for preparing the polyethersulfone fiber in the present invention since the polyethersulfone tends to have a high Tg and easily provide a fiber with high strength, which is advantageous in preparing a polyethersulfone fiber having a small fiber diameter. Moreover, it is also preferred that, in addition to the formulas (6a) and (6b), the polyethersulfone further has a structural unit represented by the formulas (7) and/or (8) below:

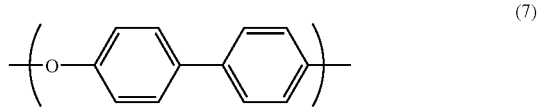

(7)

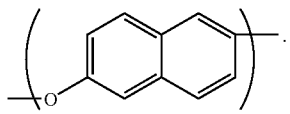 (8)

The polyethersulfone having the above-described structure can be obtained by a known method. For example, the polyethersulfone can be produced by a method of mixing an alkali metal salt of an aromatic compound having hydroxyl groups at both terminals of the compound (such as bisphenol) with a benzsulfone dihalide in an appropriate solvent, followed by heating. More specifically, as disclosed in Japanese Patent Application Laid-Open No. P-A-05-255505, the polyethersulfone can be produced by a polycondensation of a dihalogenodiphenyl compound and a divalent phenol compound in an organic polar solvent in the presence of an alkali metal compound. The polyethersulfone obtained by such a production method may have any type of group at its terminal, and examples of the terminal group of the polyethersulfone include a group such as —F, —Cl, —OH and —OR wherein R is an alkyl group.

In the present invention, a polyethersulfone fiber may be produced in an electrostatic spinning method in which a solution containing raw materials for the fiber is scattered in an electric field by electrical attraction. Specifically, a polyethersulfone fiber may be produced by the method which comprises the steps of:

discharging an electrically charged solution comprising a polyethersulfone and a solvent from a container; and drawing the charged solution by electrical attraction in an electrical field generated between the solution and an electrically charged collecting means having the opposite charge of the solution, while evaporating at least a portion of the solvent to form a polyethersulfone fiber.

One of example methods for producing the polyethersulfone fiber is as follows:

A pair of electrodes are oppositely disposed and impressed with voltage to cause an electrostatic field. In this state, the solution containing raw materials for fiber is disposed on one electrode side (typically, positive electrode), and the solution thus charged is scattered toward the other electrode side (typically, negative electrode) in an electrostatic field by electrical attraction. At that time, the solution is widely dispersed, and the raw materials for fiber contained in the solution are extended and transformed into the fiber thereof by attraction force from the other electrode side. The fiber thus formed is collected by a collection substrate disposed on the opposite electrode side, to consequently obtain a fiber substance.

The production method of the polyethersulfone fiber may be conducted using an apparatus comprising a container in which a solution of the polyethersulfone as a raw material is supplied, and a collecting means on which the resulting polyethersulfone fiber is collected.

FIG. 1 is a view showing an example electrostatic spinning apparatus which can be used as a device for producing a polyethersulfone fiber of the present invention.

As shown in FIG. 1, an electrostatic spinning apparatus 1 is composed of a syringe 2 for accommodating a solution (polymer solution 3) containing at least a polyethersulfone as a raw material, a nozzle 4 for discharging the polymer solution, which is provided at the tip end of this syringe 2, a collecting means (collection electrode 5) to which a polyethersulfone fiber formed by electrostatic spinning is attached, and a voltage generator 6 connected to the nozzle 4 and the collection electrode 5 to impress these with voltage. In this electrostatic spinning apparatus 1, the nozzle 4 functions as the above-mentioned one electrode, and the collection electrode 5 serves both as the above-mentioned other electrode and collection substrate.

In the electrostatic spinning apparatus 1, the nozzle 4 is made of electrically-conductive materials of metal and the like for functioning as the electrode. Similarly, the collection electrode 5 is made of electrically-conductive materials and may have a composition such that an insulative substrate is coated with electrically-conductive materials. The syringe 2 is a vessel capable of internally accommodating the polymer solution 3. The voltage generator 6 is connected to the nozzle 4 and the collection substrate 5, between which voltage can be impressed.

In a method for producing a polyethersulfone fiber by using the electrostatic spinning apparatus 1, a solution (polymer solution 3) comprising a polyethersulfone and a solvent may be utilized. In the polymer solution 3, a polyethersulfone is preferably dissolved in a solvent.

The solvent used for the polymer solution 3 preferably dissolves the polyethersulfone and have volatile property to be evaporated at the step of electrostatic spinning. More preferably, the solvent has a boiling point of 250° C. or lower at an ordinary pressure (about 1 atm) and is in a liquid state at a room temperature (about 25° C.). Examples of such a solvent include an amide-based solvent, a ketone-based solvent, an ester-based solvent, a sulfoxide-based solvent, an acetal-based solvent, a mixture of some of them, and the like. Examples of the amide-based solvent include N,N-dimethylformamide, N,N-dimethylacetoamide, N-methyl-2-pyrrolidone and the like. Examples of the ketone-based solvent include cyclohexanone, cyclopentanone and the like. Examples of the ester-based solvent include γ-butyrolactone and the like. Examples of the sulfoxide-based solvent include dimethylsulfoxide, sulfolane and the like. Examples of the acetal-based solvent include 1,3-dioxolan and the like.

Among them, N,N-dimethylformamide, N,N-dimethylacetoamide, N-methyl-2-pyrrolidone and dimethyl sulfoxide are preferable as a solvent. One type of the solvent may be used, or two or more types of solvent may be used together. A solvent other than the solvent mentioned above, a solvent in which the resulting polyethersulfone fiber has a small solubility and/or a non-volatile solvent, may be used within a range that does not impair characteristics of the resulting polyethersulfone fiber and workability in production thereof.

The content (concentration) of the polyethersulfone in the polymer solution 3 is preferably in the range of from 3 to 30% by weight, more preferably in the range of from 4 to 20% by weight on the basis of the total amount of the polymer solution 3. When the polymer solution 3 having the content of the polyethersulfone of smaller than 3% by weight is used, fiber formation may be difficult due to the low viscosity of the solution. On the other hand, the polymer solution 3 having the content of the polyethersulfone of larger than 30% by weight is used, the diameter of the resulting polyethersulfone fiber obtained form the polymer solution 3 tends to be larger.

In a method for producing a polyethersulfone fiber of the present invention by using the electrostatic spinning apparatus 1, the polymer solution 3 is accommodated inside the syringe 2 and supplied to the nozzle 4. This syringe 2 functions so that the polymer solution 3 accommodated inside is always filled up to the tip of the nozzle 4 at least during the electrostatic spinning, but yet does not need to push out the polymer solution 3.

When the nozzle 4 and the collection electrode 5 are impressed with voltage by operating the voltage supplier 6, an electrostatic field is generated therebetween, which result in that the polymer solution 3 in the nozzle 4 is charged and is drawn by the electrical attraction generated between the polymer solution 3 and the collection electrode 5 having the opposite charge (to the charge) of the polymer solution 3. When the impressed voltage is so high voltage that a certain degree or more of the electrical attraction is generated, then the polymer solution 3 is scattered toward the side of the collection electrode 5.

The polymer solution 3 charged and scattered from the nozzle 4 is attracted to the side of the collection electrode 5 and linearly dispersed. On this occasion, the charged solution 3 is drawn by electrical attraction in the electrical field generated between the solution and the collection electrode 5 (collecting means), while evaporating at least a portion of the solvent to form a polyethersulfone fiber. The polyethersulfone fiber thus formed reaches the collection substrate 5 and is collected on the substrate. The polyethersulfone fiber collected on the substrate typically comprises the polyethersulfone. The polyethersulfone fiber is typically produced so as to form a polyethersulfone fiber substance (fiber substance 10) such as a fiber cloth (nonwoven fabric).

In the electrostatic spinning, at least a portion of the solvent contained in the polymer solution 3 vaporizes and is removed before reaching the collection substrate 5. The electrostatic spinning may be performed under reduced pressure to remove almost all of the solvent. Unless otherwise inconvenient, the solvent which has not been removed away may be contained in the fiber substance 10.

In the electrostatic spinning, in order to sufficiently scatter the polymer solution 3, the impressed voltage is preferably in the range of from 3 to 100 kV, more preferably in the range of from 5 to 50 kV and most preferably in the range of from 8 to 30 kV in the electric potential between the nozzle 4 and the collection electrode 5. The distance between the tip of the nozzle 4 and the collection electrode 5 is preferably a distance in which the polymer solution 3 is sufficiently scattered at the preset voltage and the formed fiber can certainly reach the collection electrode 5; and for example, is preferably in the range of from 5 to 20 cm when the above-mentioned electric potential is approximately 10 kV.

The electrostatic spinning can be performed at a temperature in the range of from 0 to 50° C. depending on easiness for solvent to vaporize and on viscosity of the polymer solution 3, while the electrostatic spinning may be performed at a temperature in the range of 50° C. or higher by heating using, for example, a thermal heater when the solvent has a high boiling point and is difficult to remove. The temperature of the electrostatic spinning is a temperature of the environment surrounding the electrostatic spinning, including at least the environment where the polymer solution 3 is scattered between the nozzle 4 and the collection electrode 5 in the electrostatic spinning.

The fiber substance 10 may further be subjected to a heat treatment depending on the properties of the polyethersulfone fiber desired. The heat treatment occasionally improves mechanical strength of the fiber substance 10 made of the polyethersulfone fiber. If the heat treatment is conducted, the heat treatment is preferably performed at temperature in the range where the fiber-form of the polyethersulfone fiber is maintained.

The fiber substance 10 thus obtained may be used singly as a fiber cloth, or may also be used in combination with another member such as a support depending on easiness of handling and other demand characteristics of the fiber substance. For example, the fiber substance 10 as a fiber cloth may be formed on a support made of another fiber cloth (such as nonwoven cloth and woven cloth), a film or the like, to obtain a laminate thereof. The fiber substance 10 occasionally has a form of not merely a fiber cloth but a tube and a mesh as well.

The fiber substance 10 and the laminated body having the fiber substance 10 can be used for other than the filter, and may be applied to a wide range of uses such as barrier membrane for electrolytic battery, battery separator members and component dialytic membrane in fuel battery.

The method for producing a polyethersulfone fiber of the preferred embodiment as described above may be modified if necessary. For example, while the nozzle 4 and the collection electrode 5 as two electrodes are utilized in the preferred embodiment using the electrostatic spinning apparatus 1, three electrodes consisting of two electrodes different in voltage value and an earthed electrode may be utilized, or more electrodes may be utilized in the present invention.

In addition, while in the preferred embodiment the collection electrode 5 serves both as an electrode and a collection substrate, a collection substrate may be separately provided in front of another electrode on the side of the place is for the collecting of the fiber on which the fiber substance 10 is formed. In this case, for example, the a collection substrate having a belt shape may be adopted to perform an electrostatic spinning while being moved, so that the fiber substance 10 can be formed continuously. If the above-mentioned support is previously placed as a collection substrate, the fiber substance 10 can be formed on the support, which makes a laminate thereof.

In addition, a nozzle discharging the polymer solution 3 may not necessarily serve as an electrode, and a polyethersulfone fiber can be formed by the electrostatic spinning using an apparatus in which an electrode is disposed at the side of a nozzle so that the polymer solution 3 is charged. The nozzle need not always be one, and a plurality of nozzles may be used, which may effective in increasing a production rate of producing the fiber substance.

Since the fiber structure 10 obtained as described above has the form of a fiber cloth formed of the polyethersulfone fiber, the fiber structure 10 is suitably used as a filter. From the viewpoint of appropriately obtaining such a filter, the belt-like trapping substrate may be used or the trapping substrate may be movable for keeping a constant gap between the trapping substrate and the nozzles as described above in order to form a fiber cloth having a desired area. Also, for the purposes of obtaining a fiber cloth having a larger area and improving productivity, a multi-nozzle production using a plurality of nozzles may be performed. Further, by appropriately controlling the spinning conditions, it is possible to produce a fiber cloth having a desired thickness. For the purpose of improving characteristics of the fiber cloth and the filter using the fiber cloth, it is possible to perform drawing or a heat treatment on the obtained fiber cloth.

It is possible to use a fiber cloth like the fiber structure 10 for an air filter, an industrial filtration material, and the like, in addition to the filter. Since the fiber cloth formed of the polyethersulfone fiber obtained by the production method described above has a remarkably small fiber diameter and achieves a satisfactory mechanical strength when the thickness is reduced. It is possible to form a filter having a reduced filtration resistance and excellent filtration property (dust collecting property and fine particle trapping property) by forming the fiber cloth into a thin film.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2007-132056 filed on May 17, 2007, including specification, claims, drawings and summary, are incorporated herein by reference in their entirety.

EXAMPLES

The present invention is described in more detail by following Examples, which should not be construed as a limitation upon the scope of the present invention.

The reduced viscosity of the polyethersulfone solution prepared and the average fiber diameter of the polyethersulfone fiber cloth (a nonwoven cloth; fiber substance) produced in the following Examples and Comparative Examples were measured in accordance with the following methods.

Average Fiber Diameter:

A scanning electron microscope (SEM) photograph (5000-times magnification) on the surface of the obtained fiber substance (cloth) to be measured was taken. The fiber diameters of twenty fibers chosen with no intention in the photograph were measured, and the average value of the fiber diameters was calculated. The average value was regarded as the average fiber diameter of the fiber substance.

Reduced Viscosity of Polyethersulfone Solution:

The polyethersulfone to be measured was dissolved in a N,N-dimethylacetamide to obtain an about 0.5 g/dl solution of the polyethersulfone. In accordance with JIS-K 6721, using Uberoad-type viscosity meter (which is a capillary viscosity auto-measuring device manufactured by Shibayama Chemical Instrument Co., Ltd.), a passing time (t) of the polyethersulfone solution was measured at a temperature of 25° C. A passing time (t0) of the N,N-dimethylacetamide was also measured in the same manner at a temperature of 25° C. The reduced viscosity ($\eta$red) of the polyethersulfone solution is calculated in the formula below:

$$\eta red = (t/t0 - 1)/C$$

wherein C (g/dl) is a precise concentration of the polyethersulfone solution.

Synthetic Example 1

A 500-mL SUS316 polymerizing tank equipped with a nitrogen inlet, a paddle type stainless steel stirring blade, and a condenser was charged with 25.43 g of bis(4-fluorophenyl)sulfone and 35.04 g of 9,9-bis(4-hydroxyphenyl)fluorene, together with 354.5 g of diphenylsulfone, and then the tank was purged with dry nitrogen for 30 minutes. Subsequently, the mixture melted in an oil bath at 180° C., and then 14.37 g of potassium carbonate was added thereto.

Next, the mixture was reacted at 180° C. for one hour while being purged with nitrogen. Then, the temperature thereof was raised to 230° C. over 7 hours, followed by retaining the temperature for 12 hours to obtain a viscous polymer mixture. After that, the obtained mixture was poured into a metal tray and solidified as being cooled at a room temperature. The solidified polymer mixture was pulverized, sieved with a 1.3-mm sieve, and washed with a hot deionized water, acetone, and methanol.

After the washing, the obtained polymer mixture was dried at 150° C. overnight to obtain a polyethersulfone A. The glass transition temperature of the polyethersulfone A measured was 285° C.

Synthetic Example 2

Polyethersulfone B was obtained in the same manner as in Synthetic Example 1 except that:

28.03 g (instead of 35.04 g) of 9,9-bis(4-hydroxyphenyl)fluorene was used;

5.01 g of bisphenol S was used together with the bis(4-fluorophenyl)sulfone and the 9,9-bis(4-hydroxyphenyl)fluorene; and 1.4-mm sieve (instead of 1.3-mm sieve) was used before washing the resulting polyethersulfone mixture with the hot deionized water, acetone, and methanol.

The glass transition temperature of the polyethersulfone B measured was 274° C.

Synthetic Example 3

Polyethersulfone C was obtained in the same manner as in Synthetic Example 2 except that:

the 9,9-bis(4-hydroxyphenyl)fluorene was not used; and 12.37 g (instead of 14.37 g) of the potassium carbonate was used.

The glass transition temperature of the polyethersulfone C measured was 227° C.

Example 1

Into 180 g of N,N-dimethylacetamide, 20 g of the liquid crystalline polyester A was added and completely dissolved by heating at a temperature of 80° C. to obtain a yellowish-brown, transparent polymer solution L1 containing the liquid crystalline polyester A. The reduced viscosity of the polymer solution L1 was 0.63 g/dL.

Figure 2:
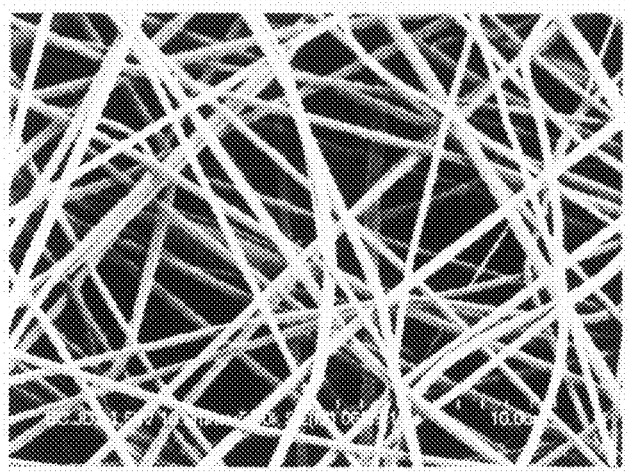
FIG. 2 is a view showing a SEM photograph of the surface of a fiber substance obtained in Example 1.

Using the apparatus shown in FIG. 1, an electrostatic spinning was performed by discharging the polymer solution from the nozzle 4 toward the collection electrode 5 for 20 minutes to form a fiber substance on the collection electrode 5. The inside diameter of the nozzle 4 was 0.7 mm, the voltage was 12 kV and the distance from the nozzle 4 to the collection electrode 5 was 12 cm. A scanning electron microscope photograph on the surface of the obtained fiber substance was taken. The photograph is shown in FIG. 2, in which the obtained fiber substance was observed to be a fiber cloth composed of fiber. In the fiber substance, each fiber was able to be clearly observed. The average fiber diameter of the fiber in the cloth was 0.25 μm. The glass transition temperature of the fiber was 285° C.

Example 2

Figure 3:
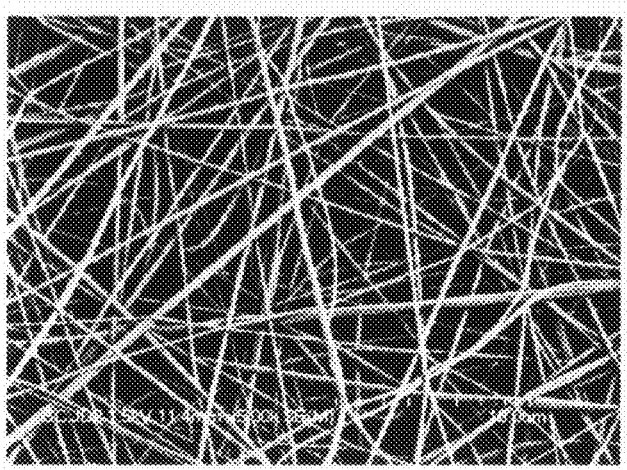
FIG. 3 is a view showing a SEM photograph on the surface of a fiber substance obtained in Example 2.

A polymer solution L2 was obtained in the same manner as in Example 1 except that the liquid crystalline polyester B was used instead of using the liquid crystalline polyester A. The reduced viscosity of the polymer solution L2 was 0.57 g/dL. The same electrostatic spinning was performed as in Example 1 except that the polymer solution L2 was used instead of using the polymer solution L1, to obtain a fiber substance. A scanning electron microscope photograph on the surface of the obtained fiber substance was taken. The photograph is shown in FIG. 3, in which the obtained fiber substance was observed to be a fiber cloth composed of fiber. In the fiber substance, each fiber was able to be clearly observed. The average fiber diameter of the fiber in the cloth was 0.23 μm. The glass transition temperature of the fiber was 274° C.

Example 3

A polymer solution L3 was obtained in the same manner as in Example 1 except that the liquid crystalline polyester C was used instead of using the liquid crystalline polyester A.

The reduced viscosity of the polymer solution L3 was 0.43 g/dL. The same electrostatic spinning was performed as in Example 1 except that the polymer solution L3 was used instead of using the polymer solution L1, to obtain a fiber substance. A scanning electron microscope photograph on the surface of the obtained fiber substance was taken. The obtained fiber substance was observed to be a fiber cloth composed of fiber. In the fiber substance, each fiber was able to be clearly observed. The average fiber diameter of the fiber in the cloth was 0.27 μm. The glass transition temperature of the fiber was 227° C.

Example 4

A polymer solution L4 was obtained in the same manner as in Example 1 except that the heating temperature was changed from 80° C. to 60° C. The polymer solution L4 was a yellowish-brown, transparent solution. The reduced viscosity of the polymer solution L4 was 0.78 g/dL.

Figure 4:
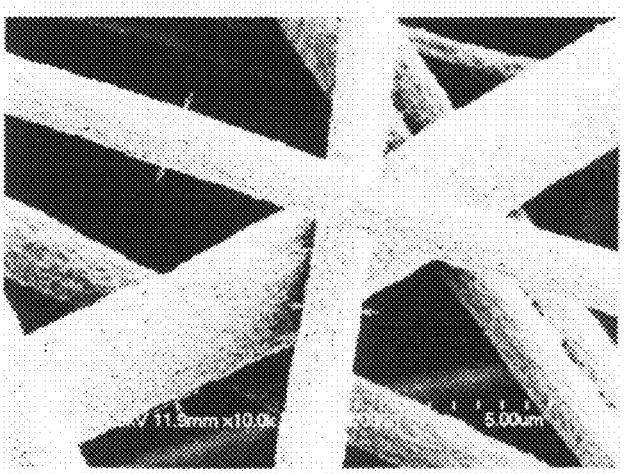
FIG. 4 is a view showing a SEM photograph on the surface of a fiber substance obtained in Example 4.

The same electrostatic spinning was performed as in Example 1 except that the polymer solution L4 was used instead of using the polymer solution L1, to obtain a fiber substance. A scanning electron microscope photograph on the surface of the obtained fiber substance was taken. The photograph is shown in FIG. 4, in which the obtained fiber substance was observed to be a fiber cloth composed of fiber. In the fiber substance, each fiber was able to be clearly observed. The average fiber diameter of the fiber in the cloth was 1.51 μm. The glass transition temperature of the fiber was 285° C.

What is claimed is:

1. A method for producing a polyethersulfone fiber, the method comprising the steps of:
    discharging an electrically charged solution comprising a polyethersulfone and a solvent from a container; and
    drawing the charged solution by electrical attraction in an electrical field generated between the solution and an electrically charged collecting means having the opposite charge of the solution, while evaporating at least a portion of the solvent to form a polyethersulfone fiber,
    wherein the polyethersulfone is a polyethersulfone of which 0.5 g/dL solution with a N,N-dimethylacetamide solvent has a reduced viscosity of from 0.4 to 0.7 g/dL at a temperature of about 25° C.

2. The method for producing a polyethersulfone fiber according to claim 1, wherein said solvent is at least one kind of solvent selected from the group consisting of N,N-dimethylacetamide, N,N-dimethylformamide, N-methylpyrrolidone and dimethyl sulfoxide.

3. The method for producing a polyethersulfone fiber according to claim 1, wherein the polyethersulfone has a structural unit represented by the formula (1) below:

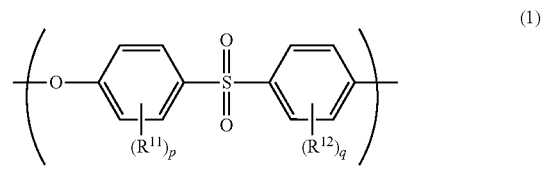

wherein each of $R^{11}$ and $R^{12}$ independently represents a halogen atom, a phenyl group, an alkyl group having 1 to 6 carbon atoms, or an alkenyl group having 2 to 10 carbon atoms; and each of p and q is independently an integer of 0 to 4, each of $R^{11}$s and $R^{12}$s being the same or different when p and/or q is 2 to 4.

4. The method for producing a polyethersulfone fiber according to claim 3, wherein the polyethersulfone further has a structural unit represented by the formula (2) below:

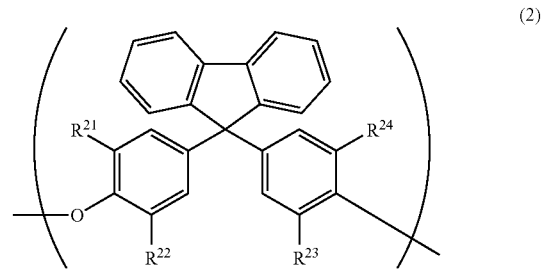

wherein each of $R^{21}$, $R^{22}$, $R^{23}$, and $R^{24}$ independently represents a hydrogen atom or an alkyl group having 1 to 6 carbon atoms.

5. The method according to claim 1, wherein the polyethersulfone is a polyethersulfone of which 0.5 g/dL solution with a N,N-dimethylacetamide solvent has a reduced viscosity of from 0.4 to 0.65 g/dL at a temperature of about 25° C.

* * * * *